(12) United States Patent
Hansen et al.

(10) Patent No.: US 10,901,084 B2
(45) Date of Patent: Jan. 26, 2021

(54) SPATIAL DELAY BEAMFORMATION

(71) Applicant: B-K Medical Aps, Herlev (DK)

(72) Inventors: Jens Munk Hansen, Copenhagen (DK); Svetoslav Ivanov Nikolov, Farum (BG); Henrik Jensen, Nordhavn (DK)

(73) Assignee: B-K Medical ApS, Herlev (DK)

( * ) Notice: Subject to any disclaimer, the term of this patent is extended or adjusted under 35 U.S.C. 154(b) by 855 days.

(21) Appl. No.: 15/388,259

(22) Filed: Dec. 22, 2016

(65) Prior Publication Data
US 2018/0180727 A1 Jun. 28, 2018

(51) Int. Cl.
G01S 15/89 (2006.01)
G01S 7/52 (2006.01)
G10K 11/34 (2006.01)

(52) U.S. Cl.
CPC ...... G01S 15/8977 (2013.01); G01S 7/52047 (2013.01); G10K 11/346 (2013.01); G01S 7/5208 (2013.01)

(58) Field of Classification Search
CPC ........ G01S 7/52; G01S 15/89; G01S 15/8977; G01S 7/52047; G01S 7/5208; G10K 11/346
See application file for complete search history.

(56) References Cited

U.S. PATENT DOCUMENTS

| 3,548,642 | A | | 12/1970 | Flaherty et al. | |
|---|---|---|---|---|---|
| 4,989,143 | A | * | 1/1991 | O'Donnell | G01H 17/00 600/437 |
| 5,388,461 | A | * | 2/1995 | Rigby | G01S 7/52023 600/442 |
| 5,885,218 | A | | 3/1999 | Teo et al. | |
| 6,343,511 | B1 | * | 2/2002 | Lynnworth | G01F 1/662 73/644 |

(Continued)

OTHER PUBLICATIONS

Christoph B. Burckhardt, P-A Grandchamp and Heinz Hoffmann, An Experimental 2 MHz Synthetic aperture sonar system intended for medical use, Sonics and Ultrasonics, IEEE Transactions on, 21(1):1-6, 1974.
S. Freeman, P. Li, and M. O'Donnel, Retrospective dynamic transmit focusing. Ultrason. Imaging, 17:173-196, 1995.
Kang-Sik Kim, Jie Liu, and Michael F Insana. Efficient array beam forming by spatial filtering for ultrasound b-mode imaging. The Journal of the Acoustical Society of America, 120(2):852-861, 2006.

(Continued)

Primary Examiner — Isam A Alsomiri
Assistant Examiner — Amie M Ndure
(74) Attorney, Agent, or Firm — Anthony M. Del Zoppo, III; Daugherty & Del Zoppo, Co., LPA (57) ABSTRACT

An ultrasound imaging includes a beamformer configured to process ultrasound echo signals generated by the plurality of elements of a transducer array. The beamformer includes a delay processor configured to generate a delay for each of the signals and apply the delays to corresponding signals and a summer configured to sum the delayed signals to produce an image. The delay processor includes a spatio-temporal processor configured to computed delays based on time-of-flight calculations from a center of the elements to one of a transmit focal point, a virtual source or a plane, a spatial correction processor configured to compute delay corrections for the computed delays, an adder configured to add the delay corrections to the computed delays to produce corrected delays, and a delay component configured to delay each of the signals with a corresponding corrected delay.

18 Claims, 11 Drawing Sheets

(56) References Cited

U.S. PATENT DOCUMENTS

| | | | | |
|---|---|---|---|---|
| 2004/0039285 | A1* | 2/2004 | Ustuner | A61B 8/0825 600/459 |
| 2004/0223636 | A1* | 11/2004 | Edic | G06T 7/0012 382/131 |
| 2007/0106157 | A1* | 5/2007 | Kaczkowski | A61B 5/015 600/438 |
| 2009/0156936 | A1* | 6/2009 | Chiang | A61B 8/4483 600/447 |
| 2012/0272738 | A1* | 11/2012 | Klessel | G01S 7/52028 73/602 |
| 2013/0281819 | A1* | 10/2013 | Schmid | A61B 5/0095 600/407 |

OTHER PUBLICATIONS

Oleg Michailovich and Allen Tannenbaum. Blind deconvolution of medical ultrasound images: a parametric inverse filtering approach. Image Processing, IEEE Transactions on, 16(12):3005-3019, 2007.

Jeffrey L. Krolik. Matched-field minimum variance beamforming in a random ocean channel. The Journal of the Acoustical Society of America, 92(3): 1408-1419, 1992.

Muyinatu A. Lediju, Gregg E. Trahey, Brett C. Byram and Jeremy J. Dahl. Short-lag spatial coherence of backscattered echoes: imaging characteristics. Ultrasonics, Ferroelectrics, and Frequency Control, IEEE Transactions on, 58(7):1377-1388, 2011.

* cited by examiner

SPATIAL DELAY BEAMFORMATION

TECHNICAL FIELD

The following generally relates to ultrasound imaging and more particularly to spatial delay beamformation.

BACKGROUND

Ultrasound (US) imaging provides useful information about the interior characteristics (e.g., organ tissue, material flow, etc.) of a subject under examination. Image quality and diagnostic capabilities depend on the inversion of the measured data, which is approximated by delay-and-sum beamformation in which the received ultrasound signals are aligned in phase and then summed.

For this, the acoustic pressure has been expressed using a spatial impulse response. For example, the transient pressure at a point in front of the transducer has been expressed as shown in EQUATION 1:

$$P(\vec{r}_0,t)=\rho\dot{v}(t)*h(\vec{r}_0,t),\qquad\text{EQUATION 1:}$$

where p represents the transient pressure, $\vec{r}_0$ represents the point in front of the transducer, t represents time, $\rho$ is the density of the medium, $\dot{v}$ represents the temporal derivative of the particle velocity near the surface, $h(\vec{r}_0, t)$ represents a spatial impulse response, and "*" represents a convolution in time.

For an acoustic hard boundary, the spatial impulse response can be expressed as shown in EQUATION 2:

$$h(\vec{r}_0, t) \int_S dS \frac{\delta(t-|\vec{r}-\vec{r}_0|/c)}{2\pi|\vec{r}-\vec{r}_0|},\qquad\text{EQUATION 2}$$

where the integral represents a spatial integration over the transducer surface S, $\delta(t)$ is the Dirac delta function, $\vec{r}$ represents a vector to a point on the surface S, and c represents the speed of sound. Generally, this equation means for a fixed time t, the spatial impulse response is given by length of intersection of a sphere centered at a point $\vec{r}_0$ intersecting the transducer surface.

When computing transient pressure fields, the time derivative of the particle velocity is evaluated from the excitation pulse v(t) and the convolution is evaluated using a fast Fourier transform (FFT). The spatial impulse response contains both low and high frequency content, and the excitation v(t) is band-limited. To exploit this, the spatial impulse is differentiated to compute pressure as shown in EQUATION 3:

$$p(\vec{r}_0,t)=\rho_0 v(t)*\dot{h}(\vec{r}_0,t),\qquad\text{EQUATION 3:}$$

where $\dot{h}$ represents the time-derivative of the spatial impulse response. The pulse-echo (pe) responses used for spatial matched filtration can be computed in a similar manner exploiting the limited band-width of the excitation as shown in EQUATION 4:

$$pe(\vec{r}_0,t)=\rho_0 v(t)*\dot{h}(\vec{r}_0,t)*\dot{h}(\vec{r}_0,t).\qquad\text{EQUATION 4:}$$

Simulating pulse-echo responses for positions in an image, for all emissions and for all receive elements is time consuming. Nonetheless, this has been done, and images can be formed through deconvolution. Alternatively, the pulse-echo responses can be measured for each channel for all positions in an image. An example setup with identical transmission across the aperture, requires the storage of a signal from 128 channels for each point in the image. This amounts to: 128 channels×512 pixels×512 pixels×64 samples×4 bytes/sample=8 GB.

Simulation methods for the spatial impulse response $\vec{h}(\vec{r}_0, t)$ exist, but it is not uncommon that sampling frequencies of above 100 MHz are required for sufficient accuracy. In addition to the heavy machinery needed for measurements or simulations, spatial matched filtration uses the simple deconvolution technique, where the signals are convolved with the time-reversed of the pulse-echo responses and this is performed for each emission, for each channel and for every point in the image.

Conventional delay and sum beamformation is all about phase computation for a group of signals exploiting that the sum of these signal can be either constructive or destructive. In medical ultrasound imaging, this is done for both the transmitted and the received field. The type of beamformation varies with the geometry of the transducer and the position of the focal points.

Figure 1:
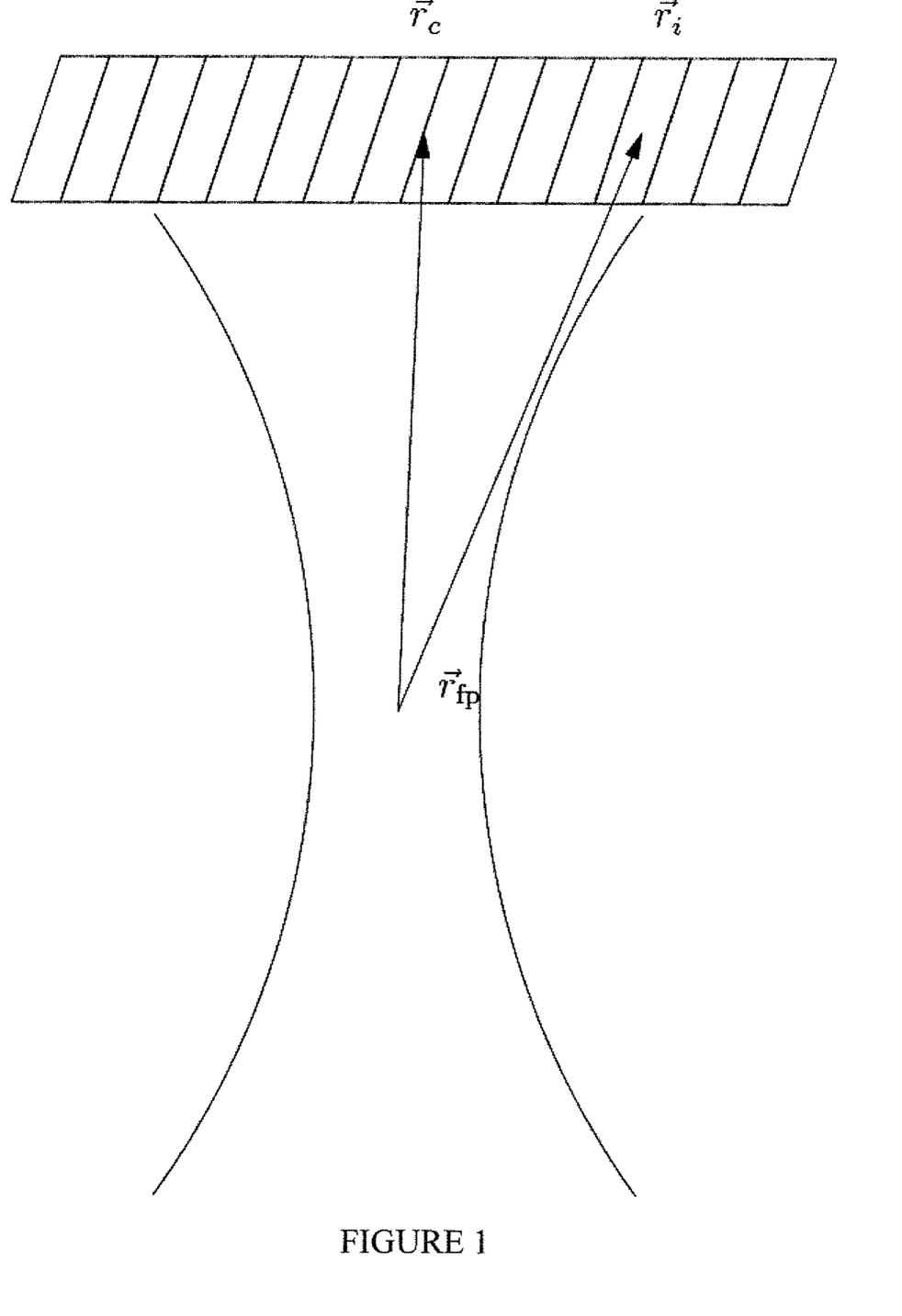
FIG. 1 illustrates focused transmission.
Figure 2:
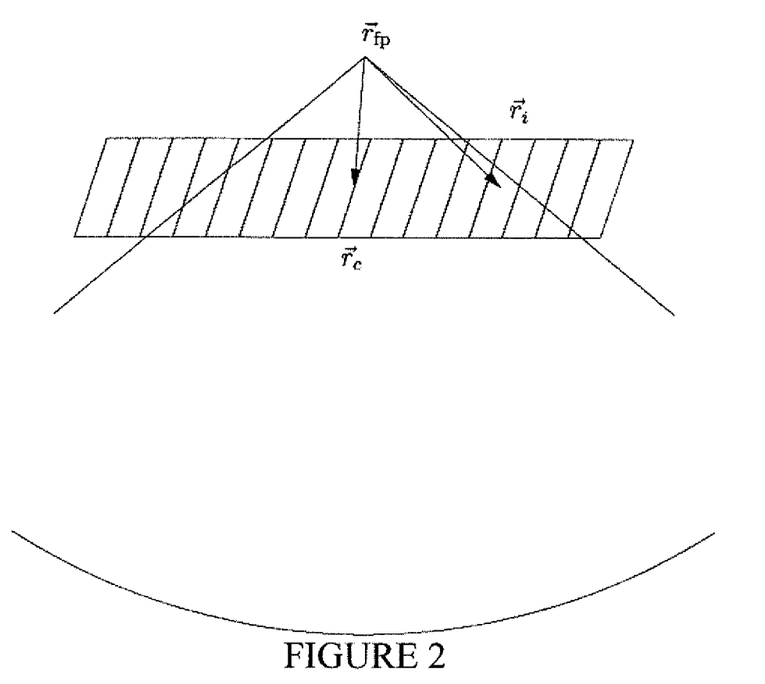
FIG. 2 illustrates defocused transmission.
Figure 3:
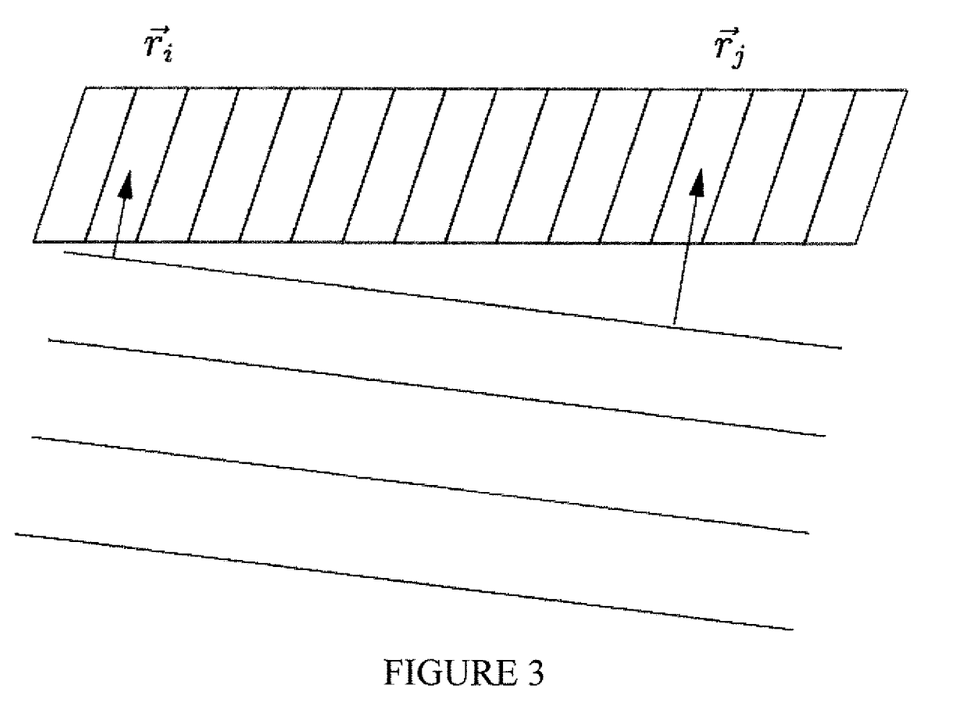
FIG. 3 illustrates plane-wave transmission.

For the transmitted field, appropriate delays and possibly an apodization are applied to the transducer elements to construct a number of signals, which sum up constructively at a single focal point (FIG. 1), diverge from a single point (FIG. 2), or form a plane-wave (FIG. 3). The delays are computed using Pythagorean focusing in which time-of-flight calculations from the center of the active elements to a transmit focal point, a virtual source or a plane are computed.

Receive beamformation is similar in the sense that appropriate delays are applied to the signals received from the individual transducer elements and then a weighted sum is performed. Contrary to transmit focusing, when receiving, one can apply a number of delays corresponding to an equal number of focus points. In addition, an apodization can be applied to even out the resolution over a range of depths.

Delays are computed based on time-of-flight $t_{TOF}$ for the sound propagating from a transmit origin, often referred to as center focus, to the focal point $\vec{r}$ and return to one of the receiving elements, $\vec{r}_i$. This task can be split into computing a transmit and a receive time corresponding to a transmit and a receive focus, $t_{TOF}=t_{TOF_{XMT}}\,t_{TOF_{RCV}}$. Assuming the speed of sound, c is constant, this can be computed as shown in EQUATION 5:

$$t_{TOF}=\frac{|\vec{r}-\vec{r}_c|+|\vec{r}_i-\vec{r}|}{c}.\qquad\text{EQUATION 5}$$

If secondary scattering is neglected, the receive path is a straight line and the receive time is uniquely determined. The transmit path however is not well defined, since the emitted pressure wave does not emanate from a point source $\vec{r}_{fp_{XMT}}$, but rather from a complicated pattern resulting from numerous waves emitted from different elements at different times obeying Huygens' principle.

Figure 4:
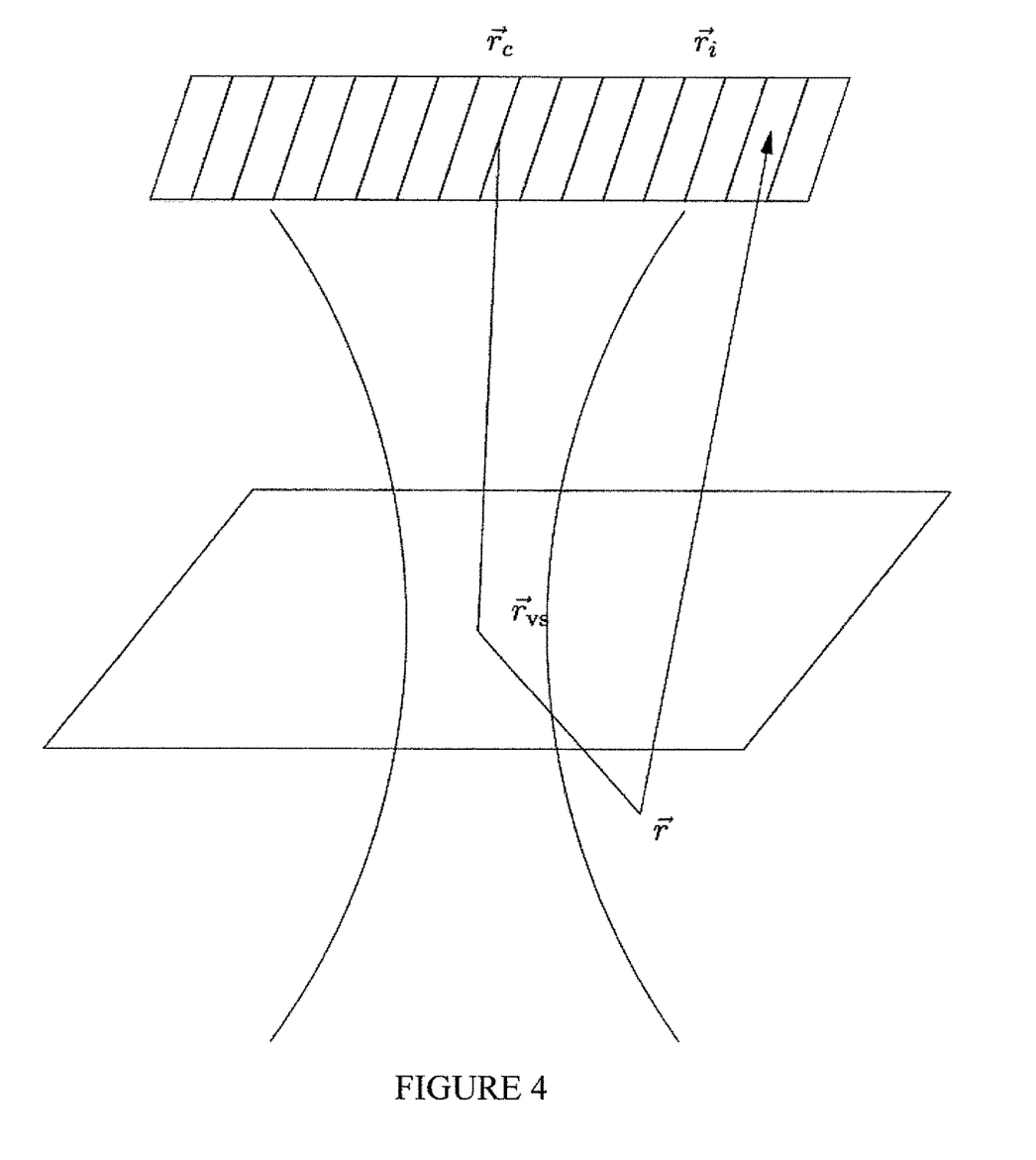
FIG. 4 illustrates a time-of-flight calculation using a virtual source.

For an unfocused beam though, EQUATION 5 is close to correct. For a focused or defocused beam, the transmit time can be approximated by considering the transmit focal point $\vec{r}_{fp_{XMT}}$ as a virtual point source emitting a spherical wave. By using this approximation, the $t_{TOF}$ can be expressed as shown in EQUATION 6:

$$t_{TOF} = \frac{|\vec{r}_{vs} - \vec{r}_c| \pm |\vec{r} - \vec{r}_{vs}| + |\vec{r}_i - \vec{r}|}{c}.$$ EQUATION 6 where the "±" refers to whether the focal point is above or below a plane orthogonal to the center line of the beam. The plane is shown in FIG. 4.

More advanced schemes have been developed. Synthetic aperture (SA) imaging is an example. SA imaging can be implemented using a 2-D time-space deconvolution. The kernels are constructed by measuring or simulating pulse echo fields throughout the field of view for each and every emission. An image is then formed by many simple convolutions of the signals with the time-reversed kernels.

This method is often referred to as spatial matched filtration (SMF) and has been shown to improve lateral resolution and contrast-to-noise ratios as compared with conventional dynamic receive focusing (DRF) methods. Unfortunately, SMF is computationally expensive, requiring tedious measurements or simulations, inverse filtering and convolutions.

SUMMARY

Aspects of the application address the above matters, and others.

In one aspect, an ultrasound imaging includes a beamformer configured to process ultrasound echo signals generated by the plurality of elements of a transducer array. The beamformer includes a delay processor configured to generate a delay for each of the signals and apply the delays to corresponding signals and a summer configured to sum the delayed signals to produce an image. The delay processor includes a spatio-temporal processor configured to computed delays based on time-of-flight calculations from a center of the elements to one of a transmit focal point, a virtual source or a plane a spatial correction processor configured to compute delay corrections for the computed delays, an adder configured to add the delay corrections to the computed delays to produce corrected delays, and a delay component configured to delay each of the signals with a corresponding corrected delay.

In another aspect, a method includes transmitting, with a plurality of transducer elements, an ultrasound signal, receiving, with the plurality of transducer elements, echoes produced in response to an interaction between the ultrasound signal and structure in the field of view, and beamforming the echoes to produce an image, wherein the beamforming includes determining and adding delay corrections to delays computed using Pythagorean distance.

In another aspect, a computer readable storage medium is encoded with computer executable instructions, which, when executed by a processor, causes the processor to: generate a delay for each of ultrasound echo signal from a time-of-flight calculation from a center of an element, generate a delay correction for each delay based on a center-of-energy of the element, correcting the delay with the delay correction, delaying signal with the corrected delay, and summing delayed signals to produce an image.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

Figure 5:
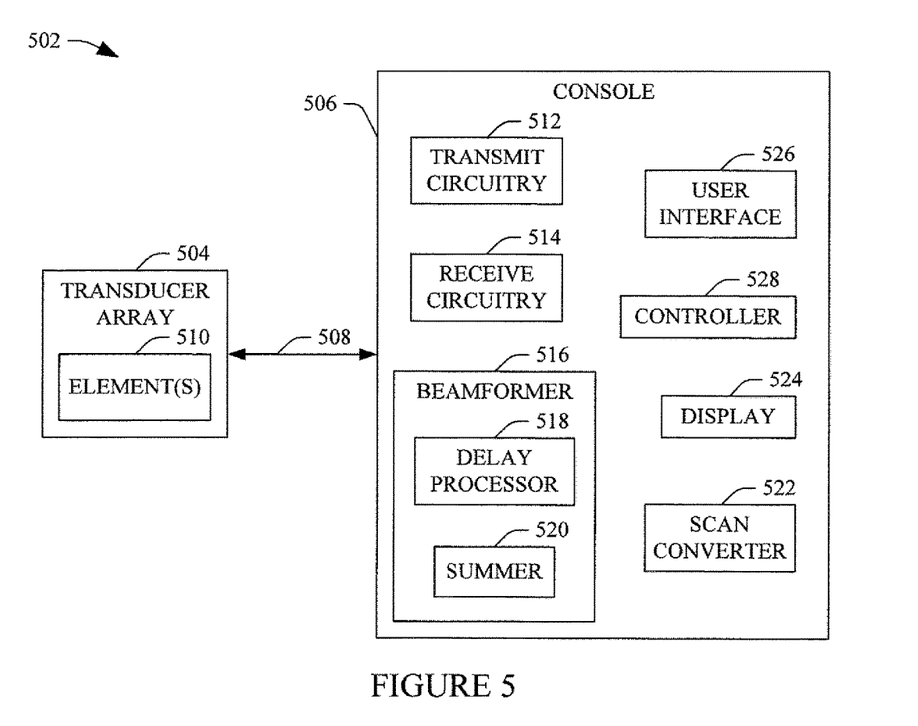
FIG. 5 schematically illustrates an example ultrasound imaging system with a beamformer configured with spatial delay beamformation.

FIG. 5 schematically illustrates an example imaging system 502, such as ultrasonic (US) imaging system. The imaging system 502 includes an ultrasound transducer array 504 and a console 506. The ultrasound transducer array 504 interfaces with the console 506 through a communication channel 508.

The array 504 includes a one or two-dimensional (1-D or 2-D) array of one or more transducing elements 510. The elements 510 are configured to convert an electrical signal to an ultrasound pressured field and an ultrasound pressured field (echoes) to an electrical signal indicative thereof. The echoes, generally, are a result of the interaction between the transmitted ultrasound pressured field and structure such as tissue cells, flowing blood cells, etc. The transducer array 504 can be linear, curved, and/or otherwise shaped, fully populated, sparse and/or a combination thereof, etc.

The console 506 includes transmit circuitry 512 that selectively excites one or more of the transducer elements 510. More particularly, the transmit circuitry 512 generates a set of pulses (or a pulsed signal) that are conveyed to the transducer array 504 and that excites a set of the transducer elements 510, causing them to transmit the ultrasound pressured field, e.g., into an examination region. Receive circuitry 514 receives the electrical signal produced by the transducer elements 510. The receive circuitry 514 may pre-process and/or condition the signal (e.g., amplify).

A beamformer 516 processes electrical signals, e.g., by applying delays to the signals and summing the delayed signals. The illustrated beamformer 516 includes a delay processor 518 which delays the signals and a summer 520 which sums the delayed signals. As described in greater detail below, the delay processor 518 computes a spatio-temporal component based on Pythagorean focusing, computes a spatial correction, and adds the spatial correction to the spatio-temporal component to compute delays applied to the signals during beamforming. The summer 520 provides conventional summing of the delayed signals. The beamformer 516 can be implemented hardware and/or software.

A scan converter 522 scan converts the data for display, e.g., by converting the beamformed data to the coordinate system of a display 524 or display region used to visually present the resulting data. A user interface (UI) 526 includes one or more input devices (e.g., a button, a knob, a slider, etc.) and/or one or more output devices (e.g., a display, etc.), which allows for interaction between with the system 502. A controller 528 controls the various components of the imaging system 502. For example, such control may include actuating or exciting individual or groups of transducer elements of the transducer array 504 for a B-mode, C-plane, and/or other data acquisition mode.

The console 506 may include one or more processors that execute one or more computer readable instructions encoded or embedded on computer readable medium (which excludes transitory medium) such as physical memory and other non-transitory medium. Additional or alternatively, the instructions can be carried in a signal, carrier wave or other transitory medium. In one instance, executing the instructions, in connection with the one or more processors, implements the beamformer 516 and/or other components of the imaging system 502.

In one instance, the transducer array 504 is part of a probe, which is a separate device relative to the console 506. Communication there between can be through a cable connected to complementary electro-mechanical interfaces and/or wireless communication interfaces. In this instance, the console 506 can be similar to a portable computer such as a laptop, a notebook, etc., with additional hardware and/or software for ultrasound imaging. The console 506 can be configured to dock to a stationary or portable docketing station.

Alternatively, the console 506 can be part of (fixed or removable) a mobile or portable cart system with wheels, casters, rollers, or the like, which can be moved around. In this instance, the display 524 may be part of or separate from the console 506. Where the cart includes a docking interface, the laptop or notebook computer type console can be interfaced with the cart and used. An example of a cart system where the console can be selectively installed and removed is described in US publication 2011/0118562 A1, entitled "Portable ultrasound scanner," and filed on Nov. 37, 2009, which is incorporated herein in its entirety by reference.

Alternatively, the transducer array 504 and the components of console 506 are part of a probe and/or other hand-held ultrasound apparatus, where the array 504 and the components are housed within, mechanically supported thereby, and/or enclosed inside the apparatus. In this instance, the transducer array 504 and/or the display 524 can be part of the housing, being structurally integrated or part of a surface or end of the hand-held ultrasound apparatus. An example of a hand-held device is in U.S. Pat. No. 7,699,776, entitled "Intuitive Ultrasonic Imaging System and Related Method Thereof," and filed on Mar. 6, 2003, which is incorporated herein in its entirety by reference.

Figure 6:
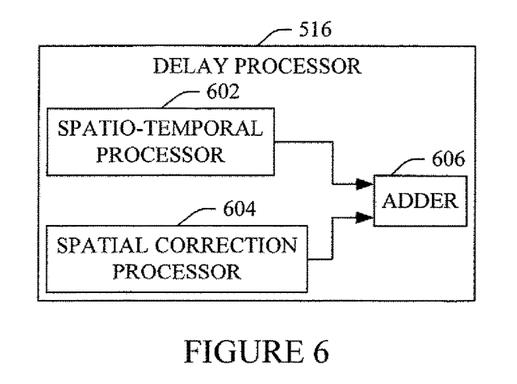
FIG. 6 schematically illustrates an example delay processor of the beamformer.

As briefly described above, the delay processor 118 computes a spatiotemporal component and a spatial correction, and adds the spatial correction to the spatiotemporal component to compute corrected delays. FIG. 6 illustrates an example of the delay processor 118, which includes a spatiotemporal processor 602, a spatial correction processor 604, and an adder 606. The following describes the spatiotemporal processor 602 and the spatial correction processor 604.

The spatio-temporal processor 602 considers elements as point objects. The maximum energy reflected from a point-like object is focused at a time, which corresponds to a pulse-echo path originating from a transmitting element or virtual source to the object and back to a center of a receiving element, where the energy is concentrated symmetrically around the center of the pulse, and where outside the response there is no signal returned from sources. For coded excitations, a temporal compression filter (TCF) is applied. This is one example of conventional approach to computing delays in conventional delay-and-sum beamforming.

When a transducer element is excited, it is not producing a spherical wave like a point source but a more sophisticated wave-front emanates. This is often described by the introduction of a spatial and a temporal response and the result is computed as the convolution of the two components. These are the spatio-temporal responses, which are used for spatial matched filtration. The spatial correction processor 604 computes their derivatives and the location of the center-of-energy and determines a difference between the delay from spatio-temporal and the true location of the center-of-energy. This difference represents a delay correction.

Figure 7:
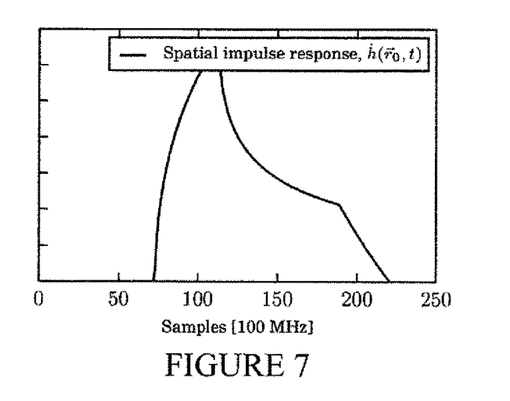
FIG. 7 illustrates an example of a derivative of a spatial impulse response.

The spatial impulse response or its time derivative can be computed with EQUATION 4. A non-limiting spatial impulse response is shown in FIG. 7. This represents the response from the transducer when a delta pulse is applied. The response depends both on the position and shape of the element. The response in FIG. 7 is for a rectangular element and the position $\vec{r}_0$ is located such that a line from $\vec{r}_0$ to the center of the element makes an angle of 45° with a surface normal.

Figure 8:
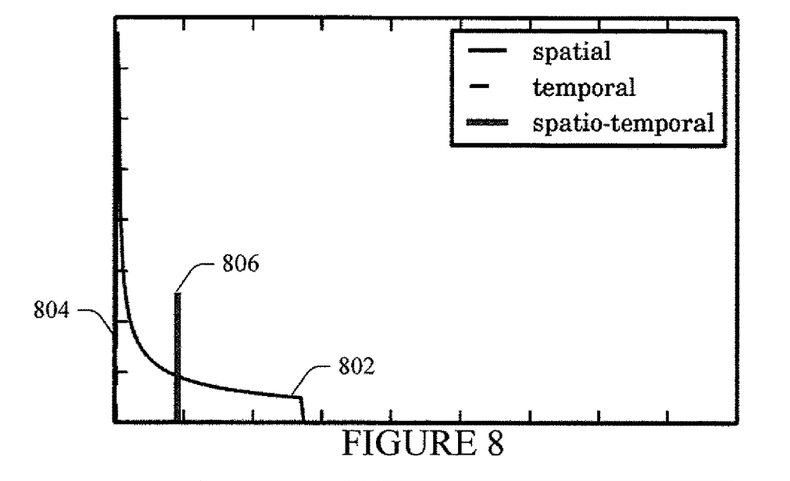
FIG. 8 illustrates an example of spatio-temporal and spatial locations on a derivative of a spatial impulse response for normal incidence on an element.
Figure 9:
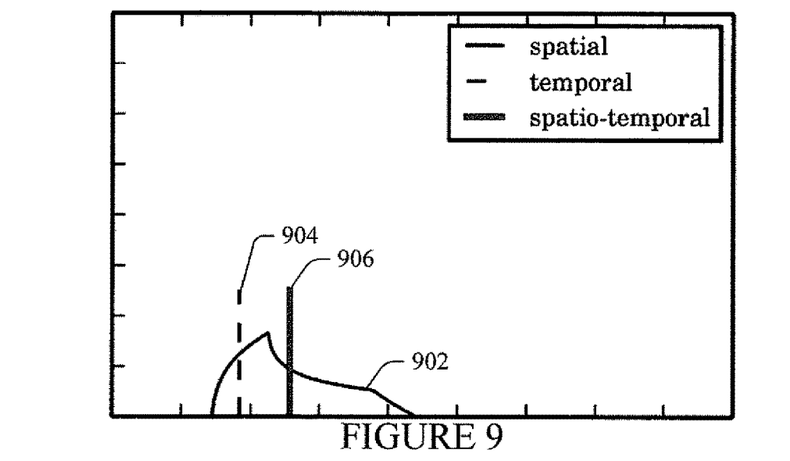
FIG. 9 illustrates an example of spatio-temporal and spatial locations on a derivative of a spatial impulse response for an angle of incidence, Θ=45° on an element.
Figure 10:
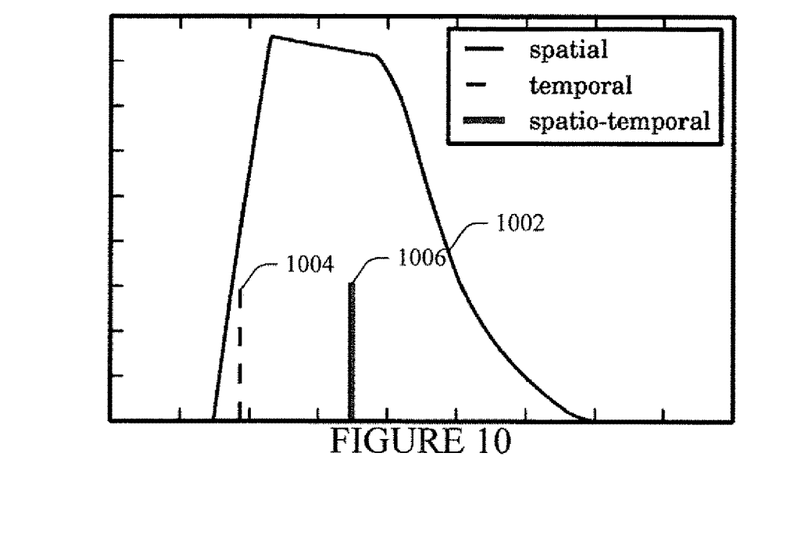
FIG. 10 shows a pulse-echo response for the responses of FIGS. 8 and 9.

For imaging, a deconvolution of the received signals using simulated or measured responses is performed. An important part is to apply correct delays. A maximum energy is achieved at the point in time where peak of the response is located, or time to peak. Outside the response there is no signal returned from sources located at $\vec{r}_0$. FIGS. 8 and 9 respectively show spatial impulse responses 802 and 902 for normal (perpendicular) incidence on an element and for an angle of incidence, $\Theta=45°$. FIG. 10 shows a pulse-echo response 1002 is composed of the two responses of FIGS. 8 and 9).

In FIGS. 8, 9, and 10, delays 804, 904 and 1004 are computed by the spatio-temporal processor 202. FIGS. 8, 9, and 10, also show correct delay 806, 906 and 1006. The delay correction is the difference between the computed delays 804, 904 and 1004 and the correct delays 806, 906 and 1006. The spatio-temporal processor 202 computes these differences. The adder 606 adds the delay correction to the spatio-temporal delay to produce a corrected delay.

In general, the delay processor 518 computes delays by replacing all time-of-flight calculations, which either start or end at a transducer element, with a time, which can be obtained using the "center-of-mass" of the time-derivative of the spatial impulse response or the time-to-peak. These times can be computed as shown in EQUATIONS 7 or 8:

$$t_1 = \frac{\int_0^\infty t h(\vec{r}_0, t)\, dt}{\int_0^\infty h(\vec{r}_0, t)}, \text{ or} \qquad \text{EQUATION 7}$$

$$t_2 = \frac{\text{argmax}_t h(\vec{r}_0, t)}{t}. \qquad \text{EQUATION 8}$$

In one instance, the corrected delays provide improved later resolution and improved contrast resolution, similar to the spatial matched filtration, but without the performing tedious measurements or simulations and no expensive inverse filtering or convolutions. In one instance, the resolution is improved by a factor of 1.5 (as judged by the auto-correlation criterion) when comparing the images to synthetic aperture images.

Figure 11:
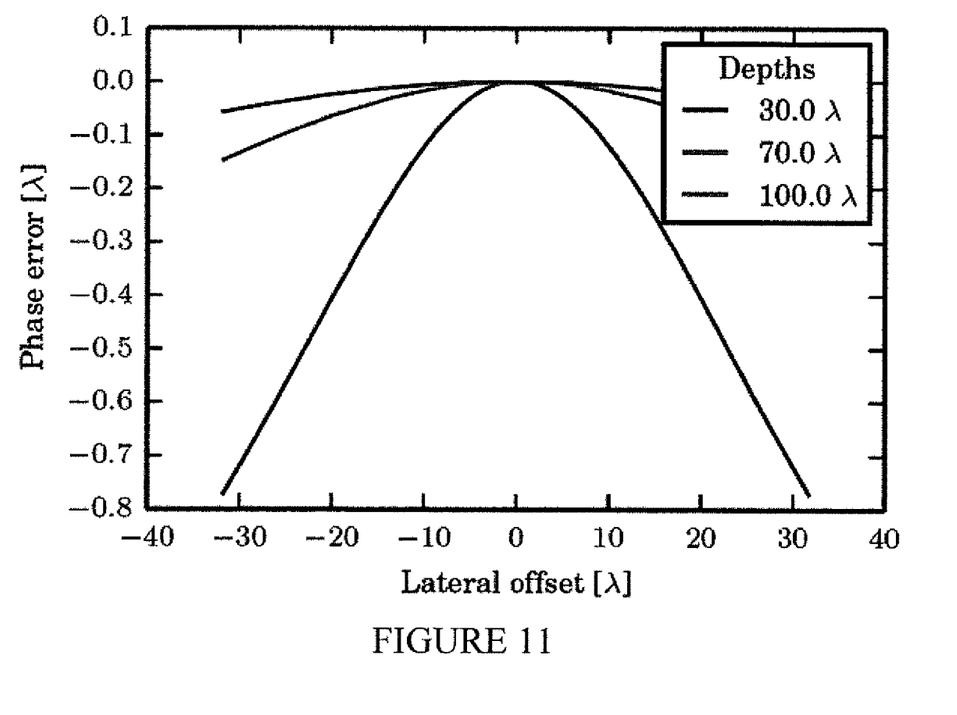
FIG. 11 shows simulated differences between the center-of-energy of the derivative of spatial impulse response.

By simulating the derivative of the spatial impulse responses for different depths and different lateral offsets, the correction can be represented by a parametric model. The parametric model depends primarily on the shape of the elements and less on the thickness of the lenses and matching layers. FIG. 11 shows an example in which the spatial correction for 128 elements has been computed for three (3) depths, 30.0, 70.0 and 100.0. To obtain these results, the derivatives of the spatial impulse responses have been simulated and the center-of-energies have been found. The difference between the center-of-energies and the time-of-flight is the correction. As shown, the curves become more flat for larger depths. The spatial corrections in FIG. 11 can be fitted using second or higher order polynomials and stored in a look-up table (LUT) and/or otherwise and stored in memory.

For time-of-flight with Pythagorean focusing, the focusing is achieved by delaying the received signals by delays, which match the difference in time-of-flight for a signal travelling from the focus point to the receiving elements and the signal travelling from the focus point to the beginning of the line. A delay curve for given line in a given receive channel may look like the one shown in FIG. 12.

Figure 12:
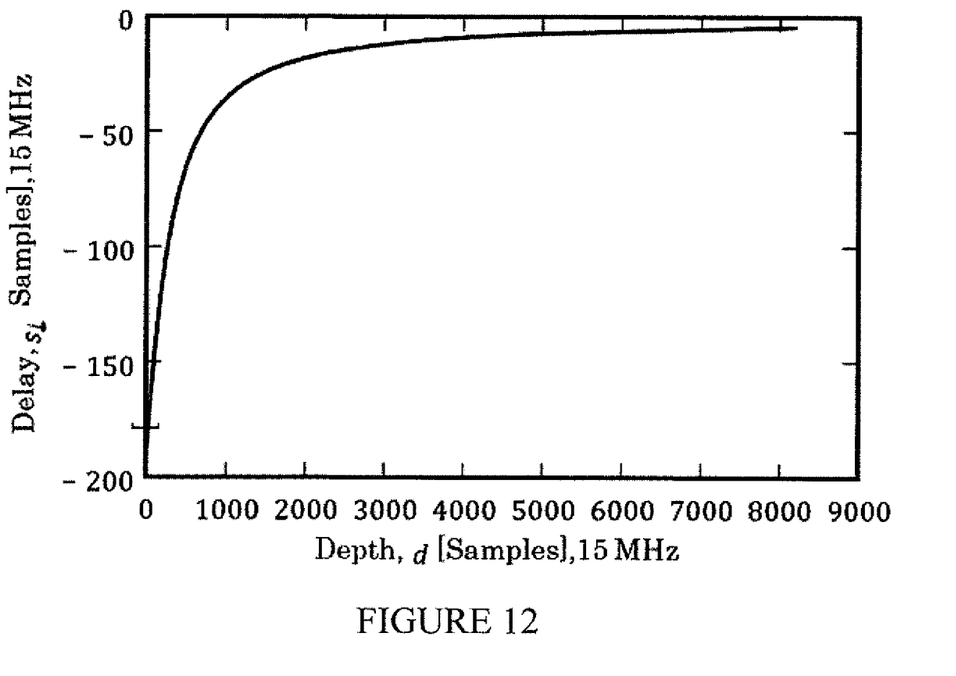
FIG. 12 shows a delay curve for an outer transducer element.

The delays for the i'th element can be computed as shown in EQUATION 9:

$$s_i(d) = d - \frac{f_s(|\vec{r}_0 - \vec{r}_{e,i}|)}{c}, \qquad \text{EQUATION 9}$$

where d is the depth in samples, $f_s$ is the sampling frequency, c is the speed-of-sound, and $\vec{r}_0$ and $\vec{r}_{e,i}$ are the position of the focus point and the i'th receiving element, respectively. In the hardware, this delay curve can be tabulated or represented using some piece-wise linear continuation.

The corrected delays can be computed as shown in EQUATION 10:

$$s_i(d) = d - \frac{f_s(|\vec{r}_0 - \vec{r}_{e,i}|)}{c} + A(d)i^2, \qquad \text{EQUATION 10}$$

where A (d) are coefficients of polynomials fitted to either simulations or measurements of the spatial correction. In one instance, this is limited to using a discrete set of coefficients with depths matching the depths for the piece-wise linear representation of the delays. The coefficient can be found using a wire phantom and/or otherwise.

Variations are discussed.

Inversion is primarily made by delay-and-sum beamformation. This comprises computation and application of channel delays and apodization for both transmit and receive elements. One would like the result of the beamformation to approximate the true inverse of the forward model, which itself is a complex model of both time and space. The pulse-echo simulation described earlier is a simple linear forward model. Spatial matched filtration can be viewed as a linear map, which equals the adjoint of the linear forward model.

Denoting the data sampled with receive element j from the i'th emission, by $y_{ij}$ the resulting image $\chi_{ab}$ can be expressed as shown in EQUATION 11:

$$\chi_{ab} = G_{ab}^{T_{ij}} y_{ij}, \qquad \text{EQUATION 11:}$$

where $G_{ab}^{T_{ij}}$ is the adjoint of the linear forward. Alternatively, a ground truth can be determined as shown in EQUATION 12:

$$\text{argmin}\delta_{ab} = |G_{ab}^{T_{ij}} - y_{ij}|. \qquad \text{EQUATION 12:}$$

That is, an image is created where the difference between the simulated signals for this image and the measured signals reach a minimum. It is important to have an accurate forward model and the corresponding adjoint. The approach described herein provides an efficient forward model, which is suitable for real-time inversion of ultrasound data.

Figure 13:
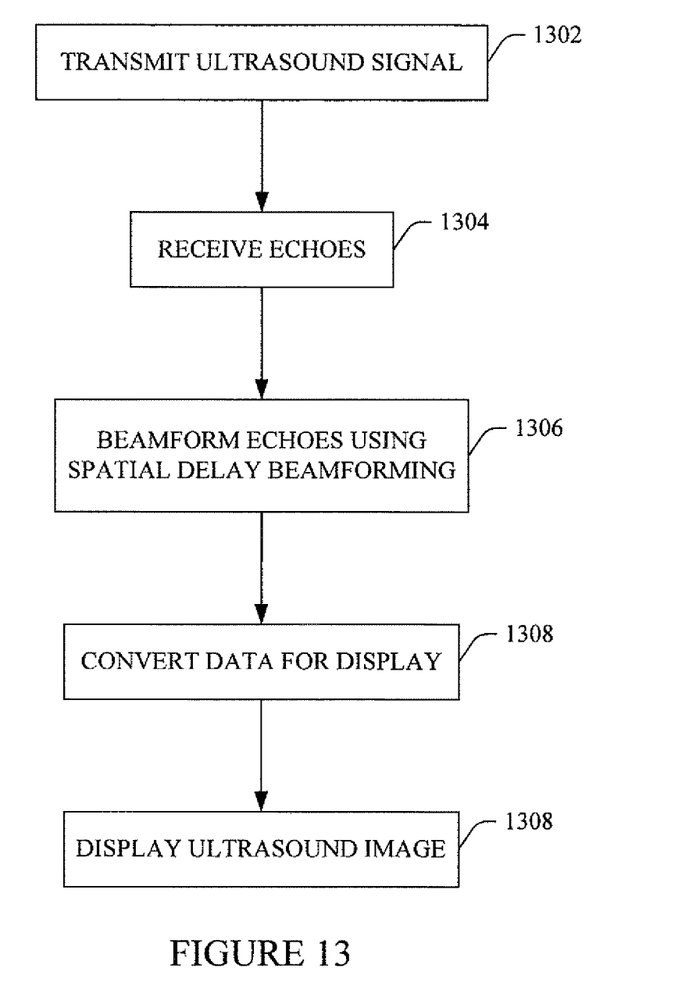
FIG. 13 illustrates an example method in accordance with an embodiment herein.

FIG. 13 illustrates a method in accordance with an embodiment herein.

The ordering of the following acts is for explanatory purposes and is not limiting. As such, one or more of the acts can be performed in a different order, including, but not limited to, concurrently. Furthermore, one or more of the acts may be omitted and/or one or more other acts may be added.

At 1302, an ultrasound transducer array transmits an ultrasound beam.

At 1304, echoes generated in response thereto are received by the ultrasound transducer array.

At 1306, the echoes are beamformed using spatial delay beamforming as described herein.

At 1308, the scan converter converts the processed echoes to data for display on a monitor.

At 1310, the ultrasound image is displayed.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

Figure 14:
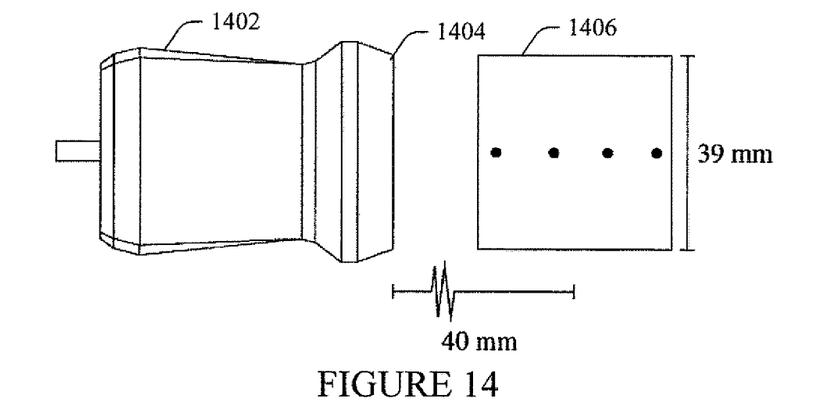
FIG. 14 shows a transducer probe and a wire-phantom.
Figure 15:
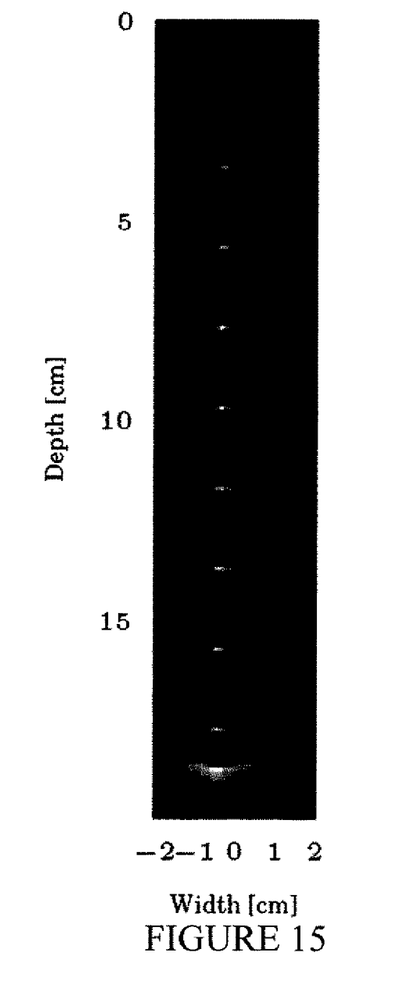
FIG. 15 shows an image of the wire phantom.

FIG. 14 shows a probe 1402 with a transducer 1404 using single-element emissions to collect channel data from a wire phantom 1406. If ideal focusing is made, the delayed signals from the receiving elements align in phase before the summation. A synthetic aperture image is formed (FIG. 15) and the image is used as initial estimates for the positions of the wires relative to the transducer 1404. The assumption is that the focusing errors must be small compared to the total time-of-flight and the distance to the wires must be large compared to the pitch.

Figure 16:
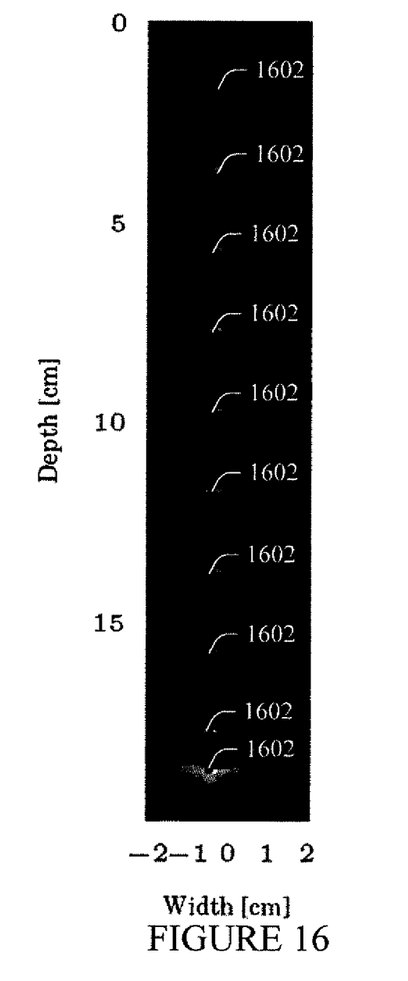
FIG. 16 shows the peak or center of the wires of the wire phantom.
Figure 17:
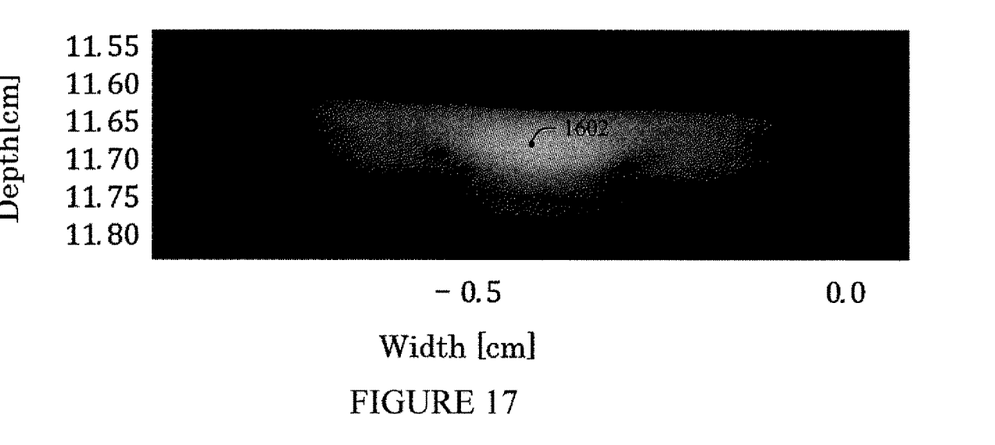
FIG. 17 shows a zoomed in portion of a wire.
Figure 18:
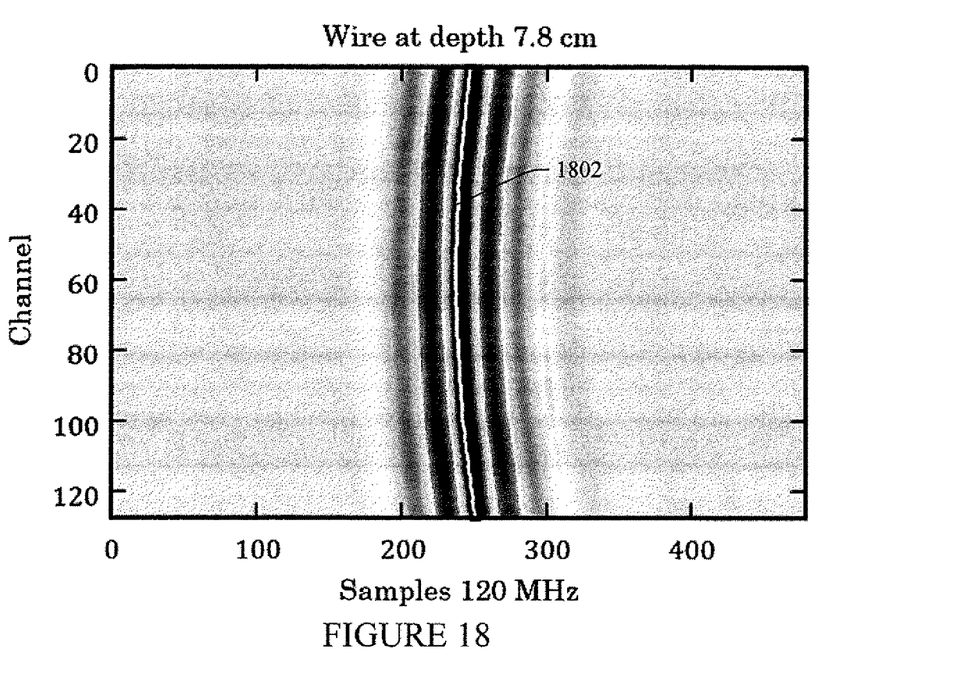
FIG. 18 shows delayed signals from the center-most emission where delays were calculated using Pythagorean distance.

FIG. 16 shows results from using an algorithm to located peaks 1602 of the wires in the synthetic aperture image. FIG. 17 shows a zoomed in portion on the wire at 7.8 cm and a peak 1602. Beamforming the signals for a line segment passing through the peak of the wire allows visualization of phase-error by aligning the signals rather than performing the summation. FIG. 18 shows signals for 128 elements visualized side-by-side after applying delays. From FIG. 18, the outermost elements have a phase error of about λ/4. For wires closer to the transducer the error is larger.

Beamforming a line using single-element emissions results in N×N estimates for combinations of lengths of ray paths for a transducer with N elements as shown in the equality of EQUATION 13:

$$\begin{pmatrix} l_1 \\ l_2 \\ \vdots \\ l_{N \times N} \end{pmatrix} = \begin{pmatrix} 2 & 0 & 0 & \ldots & 0 \\ 1 & 1 & 0 & \ldots & 0 \\ \vdots & & & & \\ 0 & 0 & 0 & \ldots & 2 \end{pmatrix} \cdot \begin{pmatrix} d_1 \\ d_2 \\ \vdots \\ d_N \end{pmatrix}, \quad \text{EQUATION 13}$$

where $d_j$ is the length of the ray path from the j'th element to the wire including a possible focusing error and $l_i$ is the position of the wire on the line passing through the initial estimate for the position of the wire. The position $l_i$ is thus determined using only a single receive channel and data from a single emission. This position can be determined by the peak of the envelope and/or by estimating lags using cross-correlation, e.g., combined with some up-sampling of the signals. The signals can be correlated with the final beamformed line passing through the wire or a linear combination of the signals from the elements, which are most central for the given wire.

The linear system $l = G \cdot d$ is solved for d, which corresponds to finding the delays such that all elliptical arcs from element pairs coincide with the wire. In one example, the damped least squares (DLS) solution to the problem is the solution d, which minimizes the quantity $\|G \cdot d - l\|^2 + \varepsilon^2 \cdot \|d\|^2$, which is equivalent to $$\left\| \begin{pmatrix} G \\ \varepsilon \mathbb{I} \end{pmatrix} d - \begin{pmatrix} l \\ 0 \end{pmatrix} \right\|^2$$

when minimized. A corresponding normal equation is show in EQUATION 14:

$$\begin{pmatrix} G \\ \varepsilon \mathbb{I} \end{pmatrix}^T \begin{pmatrix} G \\ \varepsilon \mathbb{I} \end{pmatrix} d = \begin{pmatrix} G \\ \varepsilon \mathbb{I} \end{pmatrix}^T \begin{pmatrix} l \\ 0 \end{pmatrix}, \quad \text{EQUATION 14}$$

and for $G^T G + \varepsilon^2 \mathbb{I}$ non-singular, $\hat{d}_\varepsilon = (G^T G + \varepsilon^2 \mathbb{I})^{-1} G^T l$.

A suitable way to fix the regularization parameter is to fit the data barely within the noise, and for Gaussian noise this corresponds to finding the value for E, which minimizes the equality in EQUATION 15:

$$\left| \|G \cdot d_\varepsilon - l\|^2 - (N \times N) \sigma^{-2} \right| \quad \text{EQUATION 15:}$$

where $\sigma^2$ is an estimate for the variance of the measurements l, which is assumed to be the same for all N×N measurements. If this assumption cannot be made, the last term can be replaced with the covariance matrix for the measurements.

A line 1802 in FIG. 18 represents the lags computed by cross-correlation. FIG. 18 shows the signals do not add up coherently. The pooled standard deviation for l was computed by repeating the measurement 10 times to be about 0.1 samples at 120 MHz. Using the above procedure for estimating d by finding the E, which minimizes EQUATION 15, the phase errors were estimated.

Figure 19:
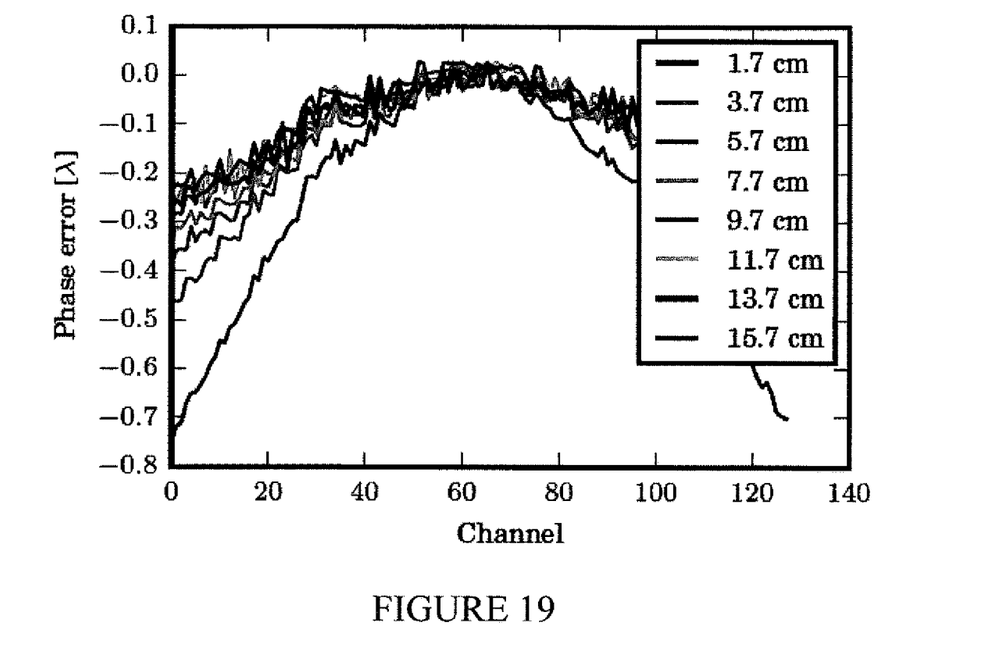
FIG. 19 shows measured phase errors.
Figure 20:
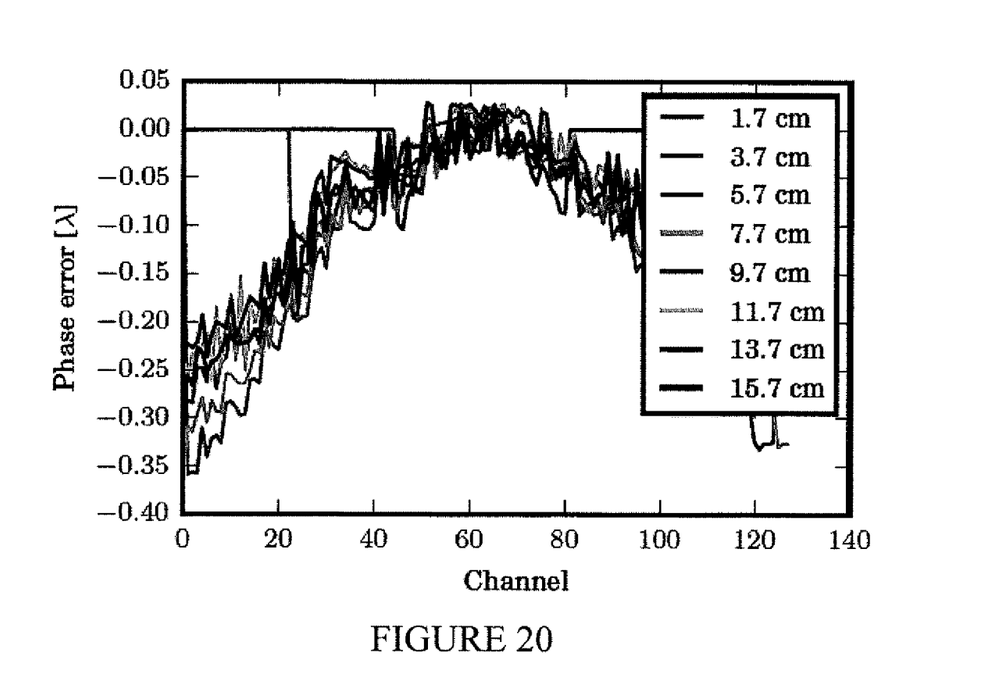
FIG. 20 shows measured phase errors for focusing using an f-number of 1.5.

FIG. 19 shows the phase errors. The focusing error is larger for wires closer to the transducer surface, and the element error increase for elements for which the angle of incidence increase. In other words, the error increases, when the f-number is lowered. If a fixed f-number is used, the errors are less profound, since fewer elements with a large angle of incidence are included. FIG. 20 shows the errors of FIG. 19 where only elements are included if they are used with an f-number equal to 1.5.

The approach described herein can also be used to improve focusing in the near field, which will have impact on near-field application such as anesthesia. Using conventional synthetic aperture focusing (STA), f-numbers of less than about 3 and 2 cannot be used for transmit and receive respectively. Going beyond these limits give rise to high side lobes and poor resolution. The degradation is due to improper focusing using the outer element, where the angle of reception is large. In such situations, conventional focusing including synthetic aperture focusing falls apart and an indication of this is that the peak of a wire is no longer well-defined. The proposed focusing strategy, spatial delay focusing (SDF), solves this issue.

By way of non-limiting example, a setup is made where an f-number of 1.0 is used for transmit and receive. Further, 128 parallel beams are used for focusing using synthetic transmit aperture. In this way, many signals are both emitted and received at large angles. To measure both contrast and detail resolution, a wire phantom is used for this purpose. An improved detail resolution is directly related to the width of the point spread function (PSF), whereas the contrast resolution is related to the clutter level and the level of the side lobes.

Figure 21:
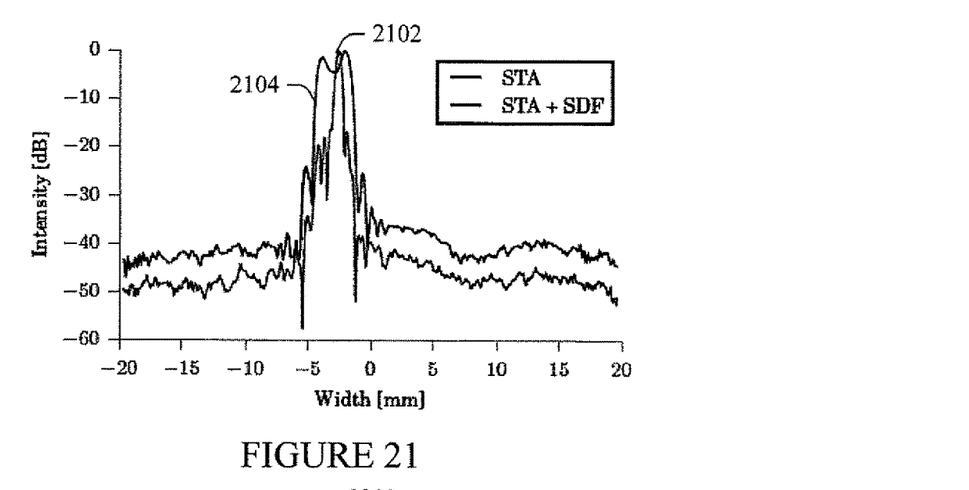
FIG. 21 compares the approach described herein against another approach with focusing for shallow depths.
Figure 22:
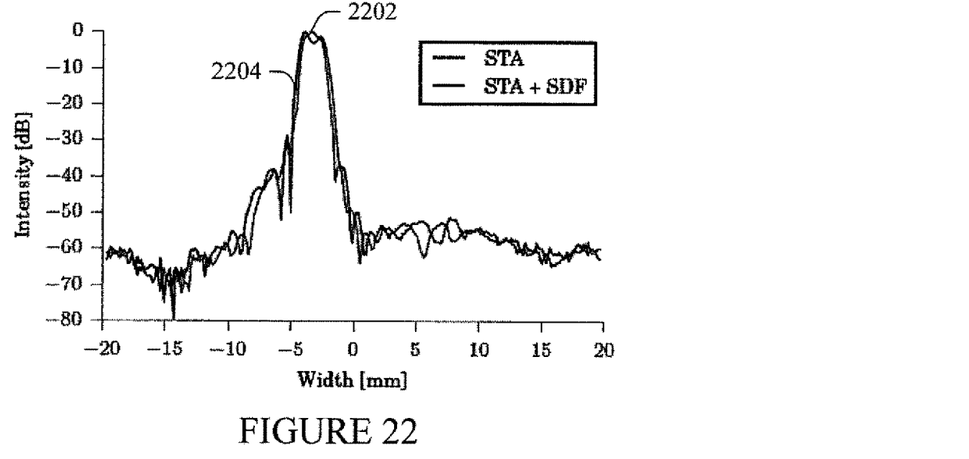
FIG. 22 compares the approach described herein against another approach with for larger depths.
Figure 23:
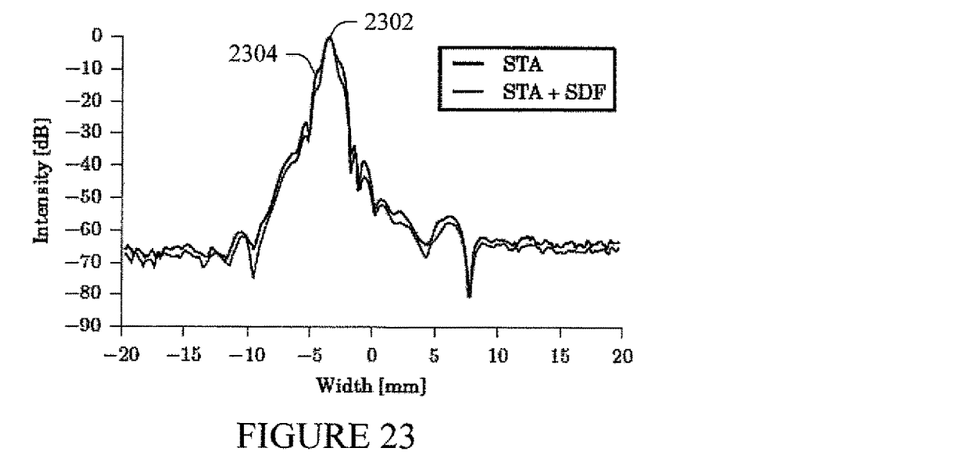
FIG. 23 compares the approach described herein against another approach with for even larger depths.

FIGS. 21, 22 and 23 compare the approach described herein (curves 2102, 2202 and 2302) against state-of-the-art focusing (curves 2104, 2204 and 2304). For shallow depths (FIG. 21), e.g., 1.7 cm, the resolution is improved and at the same time the clutter level is reduced by 5 to 6 dB. Without STA, the improved will be about half, i.e. 3 dB, since receiving is at only large angles. Another way to suppress clutter and reduce side lobes is to apply apodization, but this is achieved by sacrificing resolution. Using the proposed method, improved resolution and contrast is achieved.

For somewhat deeper depths (FIG. 22), e.g., 3.7 cm, the improvement is not as prominent as that shown in FIG. 21. The peak is more well-defined, but clutter level is roughly the same. At larger depths, (FIG. 23), e.g., 5.7 cm, less improvement is seen relative to FIG. 21. At this depth, no elements are transmitting or receiving at angles, where the proposed method can improve on the detail or contrast resolution. At depths between 1.7 and 5.7 cm, the improvement will decrease linearly.

The results in FIGS. 21, 22 and 23 directly translate to high frequency transducers, e.g. for a 9 MHz, and a contrast improvement of about 6 dB at a depth of 0.6 cm using an f-number of 1.0 is expected. Another application is cardiac imaging, where transmit and receive are at large angles most of the time. It is already known that the sensitivity of the transducer can explain some of our lack of performance for cardiac imaging. Sub-optimal beamformation may also play a role in this.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An ultrasound system, comprising:
a beamformer configured to process ultrasound echo signals generated by a plurality of elements of a transducer array, wherein the beamformer includes:
a delay processor configured to generate a delay for each of the signals and apply the delays to corresponding signals, wherein the delay processor includes:
a spatio-temporal processor configured to compute delays based on time-of-flight calculations from a center of the elements to one of a transmit focal point, a virtual source or a plane;
a spatial correction processor configured to compute delay corrections for the delays; wherein the spatial correction processor computes the delay corrections from differences between locations of the delays determined at the center of the elements and locations based on center-of-energies of the elements;
an adder configured to add the delay corrections to the computed delays to produce corrected delays;
a delay component configured to delay each of the signals with a corresponding corrected delay;
a summer configured to sum the delayed signals to produce an image.

2. The system of claim 1, wherein the spatial correction processor computes the delay corrections from spatial impulse responses of the elements.

3. The system of claim 1, wherein the spatial correction processor computes the delay corrections from time derivatives of spatial impulse responses of the elements.

4. The system of claim 3, wherein the spatial correction processor computes the delay corrections from center-of-masses of the time derivatives.

5. The system of claim 3, wherein the time derivatives are computed for the elements for transmit focus.

6. The system of claim 3, wherein the time derivatives are computed for the elements for receive focus.

7. The system of claim 1, wherein the delay corrections are computed from simulations.

8. The system of claim 7, wherein the simulations are for different depths and different lateral offsets.

9. The system of claim 8, wherein the delay corrections are represented by a parametric model.

10. The system of claim 9, wherein the parametric model includes a set of second-order polynomials.

11. The system of claim 1, wherein the delay corrections are computed from measurements of a wire phantom.

12. The system of claim 11, wherein the delay corrections are represented by an empirical model.

13. A method, comprising:
transmitting, with a plurality of transducer elements, an ultrasound signal;
receiving, with the plurality of transducer elements, echoes produced in response to an interaction between the ultrasound signal and structure in a field of view;
beamforming the echoes to produce an image, wherein the beamforming includes determining and adding delay corrections to delays computed based on Pythagorean focusing, wherein the beamforming includes:
computing the delays based on time-of-flight calculations from a center of the elements to one of a transmit focal point, a virtual source or a plane;
computing the delay corrections from differences between locations of the delays determined at the center of the elements and locations based on center-of-energies of the elements;
adding the delay corrections to the delays to produce corrected delays; and
delaying each of the signals with a corresponding corrected delay; and
summing the delayed signals to produce the image.

14. The method of claim 13, wherein the delay corrections are computed based on spatial impulse responses of the elements.

15. The method of claim 13, wherein the delay corrections are computed based on derivatives of spatial impulse responses of the elements.

16. The method of claim 13, wherein the delay corrections are computed from simulations at different depths and different lateral offsets.

17. The method of claim 13, wherein the delay corrections are computed from measurements.

18. A computer readable storage medium encoded with computer executable instructions, which, when executed by a processor, causes the processor to:
generate a delay for each of ultrasound echo signal from a time-of-flight calculation from a center of an element,
generate a delay correction for each delay based on a center-of-energy of the element, wherein the delay correction for an i'th element is based on:

$$d - \frac{f_s(|\vec{r}_0 - \vec{r}_{e,i}|)}{c} + A(d)i^2,$$

wherein d is a depth in samples, $f_s$ is a sampling frequency, c is the speed-of-sound, $\vec{r}_0$ and $\vec{r}_{e,i}$ are a position of a focus point and the i'th receiving element, respectively, and A(d) includes coefficients of polynomials fitted to either simulations or measurements of the delay correction;
correct the delay with the delay correction;
delay the signal with the corrected delay;
sum the delayed signals to produce an image.

* * * * *